United States Patent [19]
Weigand

[11] 3,800,199
[45] Mar. 26, 1974

[54] APPARATUS FOR THE ELECTRIC DAMPING OF OSCILLATIONS IN ROTATING FIELD MACHINES

[75] Inventor: Wolfgang Weigand, Erlangen, Germany

[73] Assignee: Siemens Aktiengesellschaft, Munchen, Germany

[22] Filed: June 27, 1972

[21] Appl. No.: 266,641

[30] Foreign Application Priority Data
June 29, 1971  Germany............................ 2132179

[52] U.S. Cl.................. 318/227, 318/171, 318/231
[51] Int. Cl. ............................................. H02d 5/40
[58] Field of Search .......... 318/166, 231, 171, 178, 318/227

[56] References Cited
UNITED STATES PATENTS
3,584,279  6/1971  Krauthamer...................... 318/227
3,482,157  12/1969  Borden et al. ................. 318/231 X
3,648,138  3/1972  Kalis................................... 318/231
3,612,971  10/1971  Blaschke......................... 318/230 X Primary Examiner—B. Dobeck
Attorney, Agent, or Firm—Kenyon & Kenyon Reilly Carr & Chapin

[57]  ABSTRACT

A circuit to dampen oscillations occurring in rotating field machines such as low friction hysteresis motor drives is disclosed. The circuit operates by detecting the frequency of oscillations occurring in the machines and regulating the frequency of the power fed to the motors to dampen the oscillations. The damping is produced by using a bandpass filter tuned to the frequency of the oscillations and subtracting this frequency from a predetermined frequency to thereby force the rotating stator field of the machines to track the oscillations of the machine's rotors.

4 Claims, 4 Drawing Figures

APPARATUS FOR THE ELECTRIC DAMPING OF OSCILLATIONS IN ROTATING FIELD MACHINES

BACKGROUND OF THE INVENTION

1. Field of the Invention

The present invention is concerned with apparatus for the electric damping of oscillations in rotating field machines. More particularly, it is concerned with the damping of low-friction hysteresis motor drives which are fed by frequency controlled converters.

2. Description of the Prior Art

Small irregularities in the preset frequency of jumps in the load can cause rotational oscillations of the electrical machine's rotor about the mean equilibrium position, i.e., about the axis of the revolving rotary field of the stator. This can produce disturbances in the form of power oscillations on the machine side as well as on the network side. This is particularly pronounced in synchronous electrical machines which do not have damper windings, including, for example, synchronously operated hysteresis motors having little mechanical damping.

SUMMARY OF THE INVENTION

According to the invention, the problem of damping these oscillations is solved by adding a voltage signal to the frequency control circuit of the frequency converter in which the added signal is proportional and in the same sense as the direction of the oscillations and the rotation of the rotating field of the stator. It is therefore the object of the invention to make the axis of the rotating field of the stator, which revolves with a mean angular velocity, track the oscillations of the rotor of the machine, which revolves about this equilibrium position.

According to a further feature of the invention, the adding of the voltage signal can be accomplished in a particularly simple and effective manner by means of a bandpass filter tuned to the frequency range of the oscillations and having an input proportional to the power output of the converter, and an output connected to the input of the frequency control circuit.

It has been recognized that the direction and magnitude of the rotation of the rotor relative to the axis of the rotating field of the stator can be ascertained by comparing the instantaneous value of a quantity proportional to the power with its arithmetic mean. Thus, when the instantaneous value of the power proportional quantity exceeds its mean value, the difference indicates rotor rotation opposite the direction of rotation of the stator's revolving rotary field and below synchronous operation. Further, a short term variation of the instantaneous value below the mean value indicates rotation in the direction of rotation but above synchronous operation. Thus, the output of the bandpass filter tuned to the frequency range of the oscillations can therefore be used as the correction quantity for eliminating these rotational oscillations. In addition to the active or reactive power input, the converter current or the converter voltage is suitable as the power proportional quantity.

BRIEF DESCRIPTION OF THE DRAWINGS

The embodiments of the invention will be explained with reference to the Figures, in which.

DESCRIPTION OF THE PREFERRED EMBODIMENTS

Figure 1:
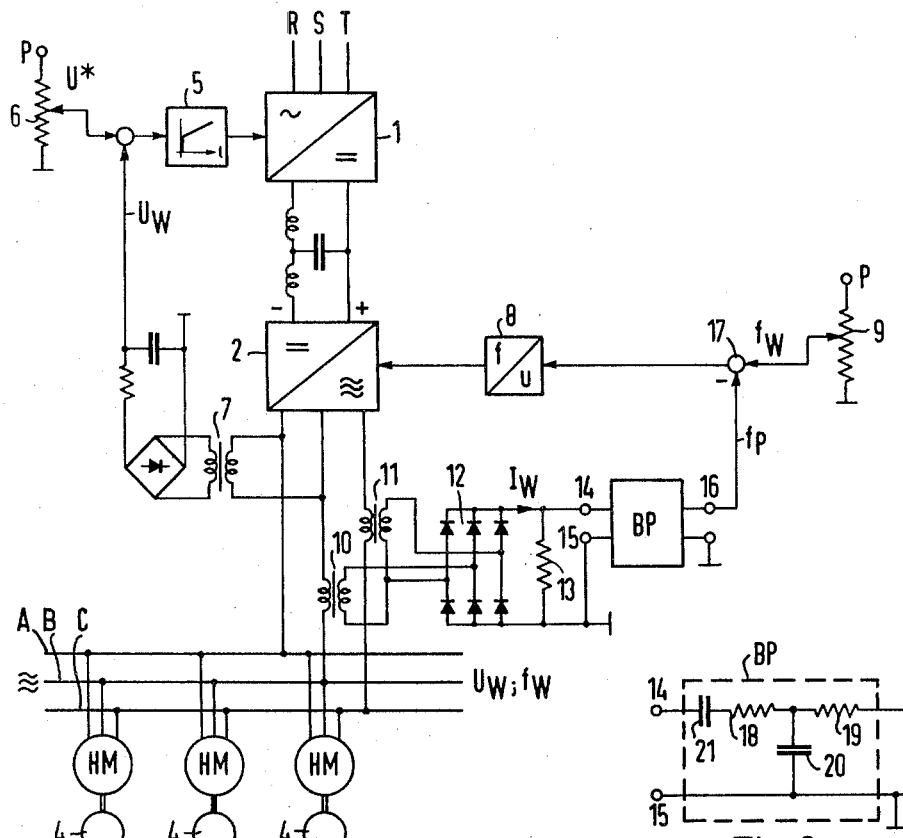
FIG. 1 illustrates a schematic circuit diagram of an embodiment of the invention.

In FIG. 1, a converter consisting of a controlled rectifier 1 and an inverter 2 having an intermediate d-c circuit is connected to a conventional 50 Hz three-phase system R, S, T and feeds a three-phase bus A, B, C with the voltage $U_w$ at frequency $f_w$, which is in the order of about 1 kHz. Connected to this medium frequency system are a number of synchronously operating hysteresis motors HM, driving centrifuges 4. Installations of this type are used, for example, for the separation of uranium isotopes and may have, depending on the size of the installation, up to a million such centrifuges, each of which requires an input power of approximately 100 W.

To control the output voltage $U_w$ of the inverter 2, a voltage regulator 5 is provided, into which is fed a d-c reference voltage U* obtained at a tap on potentiometer 6 fed from a positive d-c voltage P. The actual value of $U_w$ consists of the rectified and smoothed output voltage of voltage transformer 7 connected to the output of the inverter 2. The output voltage of the voltage regulator 5 is connected as the voltage setting input of the controlled rectifier 1. In order to set and control the frequency $f_w$, the output voltage of a voltage frequency converter 8, is connected to the frequency setting input of inverter 2. The output frequency $f_w$ of the inverter 2 is thereby set by suitably adjusting the voltage on the tap of a potentiometer 9, which is also connected to the positive d-c voltage P with the tapped voltage fed to the input of the voltage converter 8.

If the hysteresis motors connected to the medium frequency system have little damping, which is the case in the centrifuge drives mentioned above, the arrangement described so far has a strong tendency to oscillate, with the added complication that the oscillations of the individual machines synchronize each other and all the parallel electrical connections of the motors then causes them to oscillate in unison. This can lead to periodic power variations of up to 80 percent, which cannot be tolerated in practice. If hysteresis motors are used, the magnetization of the rotor discs will furthermore be reversed with oscillations of this magnitude, resulting in the generation of undesirable heat.

In order to handle the oscillations and to obtain a measuring quantity corresponding to them, two V-connected current transformers 10 and 11 are provided for the inverter output current. This output current is then rectified in a three-phase bridge rectifier 12 to produce a voltage across a load resistor 13. The rectified inverter output current $I_w$ is comprised of a d-c component, high frequency residual waves and a low frequency a-c component $f_p$ which alternates at the frequency of the oscillations. The oscillation frequency $f_p$ depends on the mechanical design of the motor drives and in the example shown varies by 0.3 Hz, depending on the extent of filling of the centrifuges. The bandpass filter BP, is selected to transmit this corresponding frequency range, while the d-c component of the current $I_w$ as well as the components which are generated by harmonics and are of higher frequency than $f_w$, are blocked by the bandpass filter. Positive polarity of the a-c component of the current $I_w$, which oscillates at the low frequency $f_p$, has a positive polarity when the oscillations are in the direction opposite to the direction of rotation, while a negative value of the low frequency a-c component indicates oscillations in the direction of rotation. The low frequency a-c component appearing at the output terminal 16 is then negatively fed to the signal $f_w$ at mixing stage 17. This may, for example, be the input of an operational amplifier, and would therefore be subtracted from the preset value of the stator frequency $f_w$, resulting in the stator field tracking the periodic variations of the rotor. This can also be considered as a control system designed to obtain a constant mean frequency, in which the phase of the rotating field of the stator is the controlled frequency.

Figure 2:
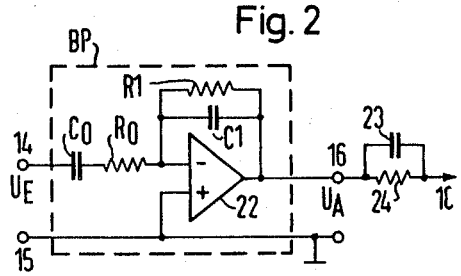
FIG. 2 illustrates a passive bandpass filter adapted to be used in carrying out the invention.

In FIG. 2, a passive bandpass filter is shown consisting of two series resistors 18 and 19, at whose junction a shunt capacitor 20 is connected and joined to the input terminal 15. A series capacitor 21 precedes the series resistor 18 and is connected to the input terminal 14.

Figure 3:
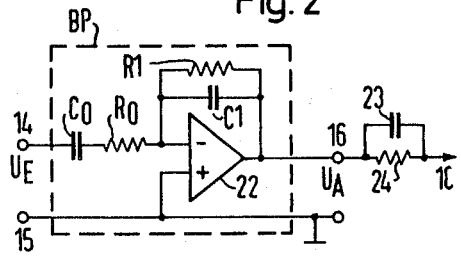
FIG. 3 illustrates an active bandpass filter adapted to be used in carrying out the invention.

Another example of an embodiment for carrying out the invention is an active bandpass filter shown in FIG. 3. It consists of a very high gain, open circuit operational amplifier 22 having a capacitor $C_0$ and a resistor $R_0$ connected in series in its input circuit and a resistor $R_1$ and a capacitor $C_1$ connected in shunt in the negative feedback circuit of the amplifier. The d-c component $(f=0)$ is blocked by capacitor $C_0$, and capacitor $C_1$ suppresses the high frequency $(f > f_w)$ components. For the range of oscillation frequencies $\Delta f_p$, however, lying between these two frequencies, the input signal $U_E$ is amplified by the bandpass filter BP at approximately constant gain.

It may be advisable to arrange a lead circuit for the mean frequencies in the control loop shown in FIG. 1 in order that the output signal of the bandpass filter is not fed directly to the mixing stage 17 but, as indicated in FIG. 3, can be fed through the shunt combination of the resistor 24 and the capacitor 23. In this manner an acceleration of the control speed and thereby a particularly quick damping of the oscillations can be achieved.

Figure 4:
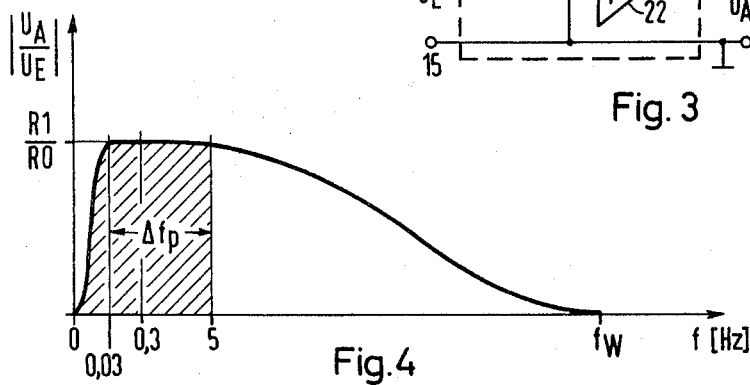
FIG. 4 illustrates the gain of the bandpass filter utilized in carrying out the invention.

FIG. 4 shows in general the shape of the gain of the bandpass filter BP, i.e., the ratio of the magnitude $U_A/U_E$ as a function of the frequency f of the input voltage $U_E$. For values $C_0 = 470$ $\mu$F, $R_0 = 10$ k/ohm, $R_1 = 15$ k/ohm and $C_1 = 3.3$ $\mu$F, there is approximately constant gain in a range of frequencies $\Delta f_p$, between 0.03 Hz and 5 Hz, in which the oscillation frequencies would be expected to occur. The maximum gain is thus determined by the resistance ratio $R_1/R_0 = 1.5$. The blocking effect at the frequency $f = 0$ (d-c) and at frequencies $f \geq f_w$ can be further seen from FIG. 4.

The invention can be applied to all types of rotating field machines which are capable of oscillating, such as, for instance, synchronous, asynchronous and reluctance machines.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A circuit for the damping of oscillations occuring in rotating field machinery the input to the machinery having a pre-determined frequency which is supplied by a frequency controlled converter, the circuit comprising a feed back circuit to control the frequency input to the rotating field of the stator in response to oscillations occuring in the rotor of the rotating field machine, in which said feed back circuit comprises:
   a. means for detecting a quantity proportional to the power of the output of the frequency control convertor;
   b. a bandpass filter circuit coupled to said power detecting means, the input to the band pass filter circuit thus being a function of the oscillations, the bandpass filter circuit comprising an operational amplifier having a high open circuit gain, the input of which comprises a capacitor and resistor connected in series and a negative feedback of which comprises the parallel combination of a resistor capacitor, the bandpass filter being tuned to the frequency range of the oscillation;
   c. a mixing stage the first input of which is connected to the output of the bandpass filter circuit and the second input of which is supplied by a predetermined frequency signal, the mixing stage subtracting the frequency signal passed by the bandpass circuit from a predetermined frequency signal; and
   d. a variable input voltage to frequency convertor the input of which is coupled to the output of the mixing stage for feeding the resulting signal of the mixing stage as the input signal to the voltage to frequency converter, the output of which is connected to the frequency setting of the input convertor.

2. A circuit for the damping of oscillations occurring in rotating field machinery having a predetermined frequency input as in claim 1 wherein the rotating field machinery comprises
   a plurality of hysteresis motors connected in parallel, and
   the voltage frequency converter comprises
   a controlled rectifier, and
   an inverter, the input of which is the output of the rectifier.

3. A circuit for the damping of oscillations occurring in rotating field machinery having a predetermined frequency input as in claim 1 in which the output of the bandpass filter is fed through a lead circuit.

4. A circuit for the damping of oscillations occurring in rotating field machinery having a predetermined frequency input as in claim 1 wherein the rotating field machines are comprised of low friction hysteresis motors and wherein the bandpass filter is connected by a current transformer to the output of the converter.

* * * * *

UNITED STATES PATENT OFFICE
CERTIFICATE OF CORRECTION

Patent No. 3,800,199          Dated March 26, 1974

Inventor(s) Wolfgang Weigand

It is certified that error appears in the above-identified patent and that said Letters Patent are hereby corrected as shown below:

In the Foreign Application Priority Data change the file number of the German application upon which the claim for priority is based from "2132179" to --P 21 32 179.9--

In column 1, line 13 change "frequency of jumps" to --frequency or jumps--

Signed and sealed this 13th day of August 1974.

(SEAL)
Attest:

McCOY M. GIBSON, JR.          C. MARSHALL DANN
Attesting Officer          Commissioner of Patents